(12) United States Patent
Hilger et al.

(10) Patent No.: US 8,294,560 B2
(45) Date of Patent: Oct. 23, 2012

(54) METHOD AND APPARATUS FOR IDENTIFYING THREATS USING MULTIPLE SENSORS IN A GRAPHICAL USER INTERFACE

(75) Inventors: James E Hilger, Reston, VA (US); John D Hodapp, Springfield, VA (US); Sean M Jellish, Fairfax, VA (US); Christopher H Marshall, Alexandria, VA (US); John K Ramsey, Jr., Annandale, VA (US); Philip Perconti, Alexandria, VA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 648 days.

(21) Appl. No.: 12/505,622

(22) Filed: Jul. 20, 2009

(65) Prior Publication Data

US 2011/0012719 A1    Jan. 20, 2011

(51) Int. Cl.
*B60Q 1/00* (2006.01)
*G06K 9/32* (2006.01)
(52) U.S. Cl. ........ 340/435; 340/436; 348/148; 348/159; 382/103; 382/104; 382/293; 382/294; 382/298
(58) Field of Classification Search .................. 340/435, 340/436; 348/148, 159; 382/103, 104, 293, 382/294, 298
See application file for complete search history.

(56) References Cited

U.S. PATENT DOCUMENTS

| | | | |
|---|---|---|---|
| 4,286,289 A * | 8/1981 | Ottesen et al. | 348/169 |
| 5,648,868 A | 7/1997 | Hall et al. | |
| 5,872,594 A * | 2/1999 | Thompson | 348/211.6 |
| 6,215,519 B1 * | 4/2001 | Nayar et al. | 348/159 |
| 6,977,676 B1 * | 12/2005 | Sato et al. | 348/211.11 |
| 7,106,314 B2 | 9/2006 | Munje | |
| 7,133,537 B1 * | 11/2006 | Reid | 382/103 |
| 7,151,562 B1 | 12/2006 | Trajkovic | |
| 7,342,489 B1 * | 3/2008 | Milinusic et al. | 340/506 |
| 7,636,452 B2 * | 12/2009 | Kamon | 382/103 |
| 7,965,314 B1 * | 6/2011 | Miller et al. | 348/164 |
| 2002/0180759 A1 * | 12/2002 | Park et al. | 345/629 |

(Continued)

OTHER PUBLICATIONS

Internet web posting: http://www.dtic.mil/ndia/2008maneuver/Reago.pdf , Dr. Donald A. Reago, Jr., "NVESD S&T for Maneuver Support," 2008 Maneuver Support Science and Technology Conference and Exhibit presentation slides dated Jul. 29, 2008.

(Continued)

*Primary Examiner* — Jennifer Mehmood
*Assistant Examiner* — Andrew Bee
(74) *Attorney, Agent, or Firm* — Richard J. Kim

(57) ABSTRACT

A system of imaging and non-imaging sensors are used in combination with a graphical user interface (GUI) system on a vehicle to detect items of interest. In particular, a GUI has been developed that seamlessly integrates high magnification, Narrow Field of View (NFOV) imaging sensors and Wide Field of View (WFOV) imaging sensors. The GUI is capable of displaying both WFOV and NFOV images, gimbal controls, and allow NFOV sensor to be pointed to any location within the wide field of view efficiently by a single touch of a touch screen display. The overall goal is to allow an operator to select which imagery from multiple WFOV sensors to display in order to prescreen regions of interest that require further investigation using sensors with more magnification.

6 Claims, 5 Drawing Sheets

U.S. PATENT DOCUMENTS

| | | | |
|---|---|---|---|
| 2003/0136249 A1 | 7/2003 | Inoue et al. | |
| 2004/0183712 A1 | 9/2004 | Levitan et al. | |
| 2004/0218714 A1 | 11/2004 | Faust | |
| 2006/0033813 A1* | 2/2006 | Provinsal et al. | 348/143 |
| 2006/0209186 A1* | 9/2006 | Iyoda et al. | 348/142 |
| 2007/0051235 A1* | 3/2007 | Hawkes et al. | 89/37.04 |
| 2008/0027648 A1 | 1/2008 | Fujiwara et al. | |

OTHER PUBLICATIONS

Internet web page: http://www.defense-update.com/events/2006/summary/ausa06cied.htm , "Counter IED Systems at AUSA 06," an IMDEX Asia 2009 presentation at Singapore Expo, May 12-14, 2009.

Internet web page: http://www.iqpcevents.com/ShowEvent.aspx?id=39650&details=39664 , "Introducing the latest information on IED and EFP Threats," Counter IED & EFP Summit 2008 IDGA Conference held at Arlington, VA, Jan. 28-30, 2008.

Internet web page: http://www.defendamerica.mil/articles/sep2005/a092605wm2.html , "Afghan Army Learns How to Counter IEDs," Defend America news article dated Sep. 26, 2005.

Internet web posting: http://spie.org/x17125.xml?pf=true&highlight=x2412&ArticleID=x17125 , "Combining tunability and high-resolution FLIR detection improves target recognition," Tuning in to Detection, SPIE Newsroom: DOI 10.1117/2.5200404.0003, Apr. 31, 2004.

Internet web page: http://oai.dtic.mil/oai/oai?verb=getRecord&metadataPrefix=html&identifier=ADP021702, "Overview of Sensor Fusion Research at RDECOM NVESD & Recent Results on Vehicle Detection Using Multiple Sensor Nodes," Accession No. ADP 021702, report date: 2003.

Internet web page: http://www.asdwire.com/news_detail/7874/US_Defense_Contractor_HSS_Inc_Introduces... , "US Defense Contractor HSS Inc Introduces Innovative Bomb Jamming Technology," ASDWire, Nov. 5, 2007.

Internet web page: http://www2.computer.org/portal/web/csdl/abs/proceedings/aipr/2003/2029/00/20290056a... , Perconti et al, "Vehicle Detection Approaches Using the NVESD Sensor Fusion Testbed," aipr, pp. 56, Applied Imagery Pattern Recognition Workshop (AIPR '03), 2003.

Rugged Pan-Tilt Unit Compliant with Driver's Vision Enhancer (DVE) and FADS Systems, DirectedPerception Model PTU-D48-DVE technical specification sheet, printed Jan. 2009.

Philip Perconti et al., redacted paper entitled "Counter IED Graphical User Interface," submitted for 2008 Meeting of the Military Sensing Symposia (MSS) held Feb. 4-7, 2008, CD distribution of digital copy on Jun. 2009.

* cited by examiner

METHOD AND APPARATUS FOR IDENTIFYING THREATS USING MULTIPLE SENSORS IN A GRAPHICAL USER INTERFACE

GOVERNMENT INTEREST

The invention described herein may be manufactured, used, sold, imported and/or licensed by or for the United States Government.

FIELD OF THE DISCLOSURE

A system of imaging and non-imaging sensors are used in combination with a graphical user interface (GUI) system on a vehicle to detect items of interest.

BACKGROUND INFORMATION

Cameras have been used to visually identify unknown objects. But cameras with wide angle lenses do not have sufficient resolution to identify faint objects in their natural background.

SUMMARY

There is a need for new or improved systems to rapidly evaluate the threat potential of faint objects at a relatively long distance. This technology is also applicable to other platforms whether or not moveable.

In one aspect, there is disclosed an exemplary GUI system to integrate multiple low magnification Wide Field of View (WFOV) sensors with high magnification sensors in different combinations to point Narrow Field of View (NFOV) sensors at regions of interest. The operator can thereby maintain situational awareness and context while viewing those regions of interest.

In another aspect of the disclosure, an exemplary GUI system is provided with an electrical "T" connection between the GUI system and the Gyrocam™ gimbal to integrate an analog sensor system with a digital GUI system. This approach minimizes the amount of hardware necessary to accomplish the overall goal.

In yet another aspect of the disclosure, a method of identifying threats is disclosed using multiple sensors in a graphical user interface. Such a method comprises the steps of: reading x and y coordinate values of an object image as located in a context image provided by a sensor capable of a context field of view; using the context field of view to convert the x and y coordinate values to a first set of azimuth and elevation values for the object image from the context sensor; projecting a vector from the context sensor location in a direction indicated by the first set of azimuth and elevation values for the object image to calculate an intercept with a flat ground plane at a point T; calculating a set of derived azimuth and elevation values based on a spatial relationship between the gimbal sensor and the point T; and using the derived azimuth and elevation values as a basis for pointing the gimbal sensor at T.

In yet another aspect of the disclosure, a computer program for execution by a computing device is disclosed for identifying threats using multiple sensors in a graphical user interface. Such a computer program comprises the executable steps of: requesting an image frame from a context sensor; reading a gimbal location to get a current pointing angle; and commanding the gimbal to point in a direction.

DETAILED DESCRIPTION

Figure 1:
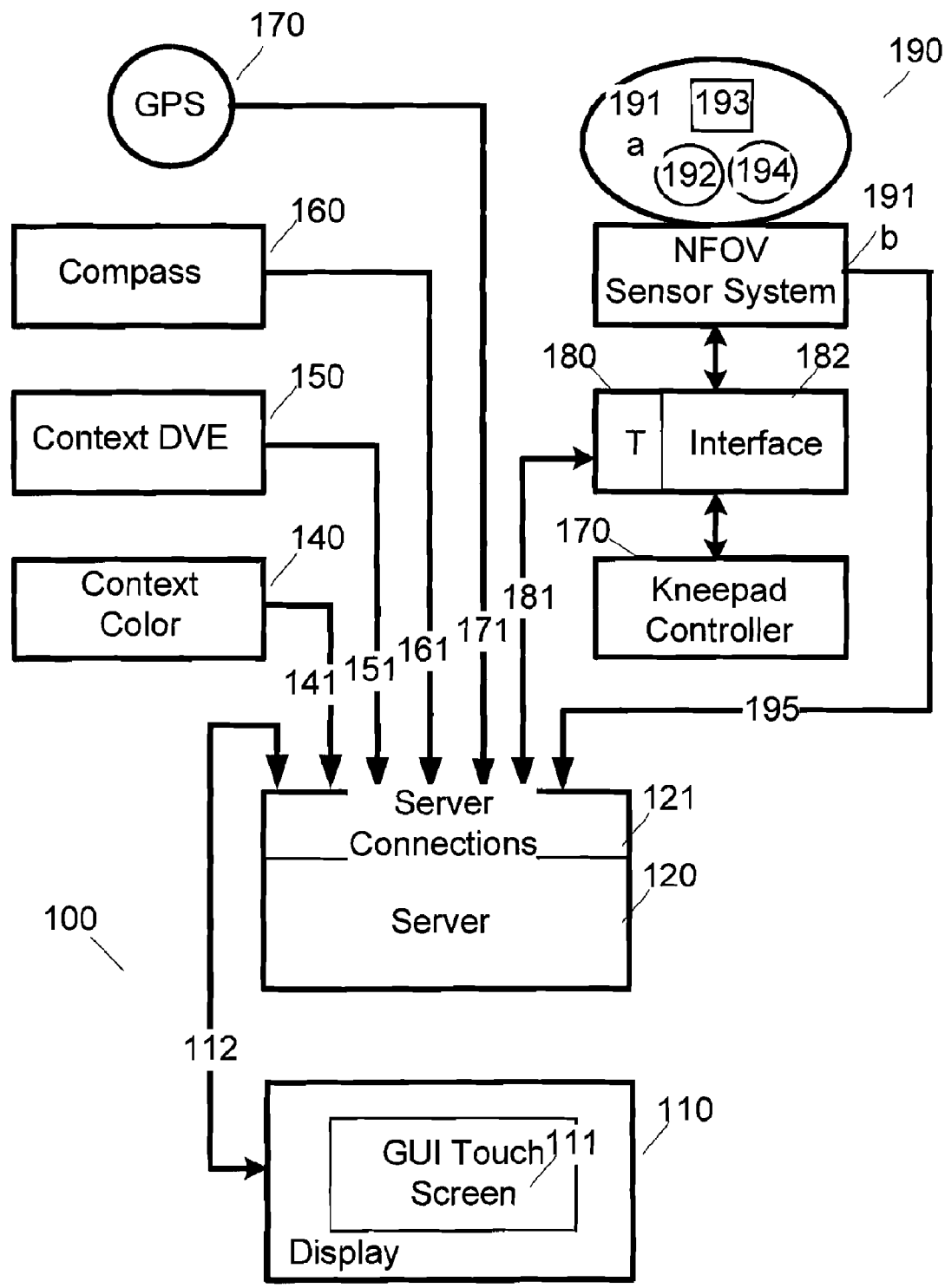
FIG. 1 is a block diagram of a sensor-based image processing system involving a graphical user interface.

FIG. 1 is a block diagram of a sensor-based image processing system involving a graphical user interface. It shows how the various components of the system are linked to each other.

An exemplary GUI system 100 is based on multiple low magnification Wide Field of View (WFOV) sensors (140 and 150) and high magnification sensors in different combinations which operate to point Narrow Field of View (NFOV) sensors (192-194) at regions of interest based on a multi-axis stabilization (191*b*).

In order to achieve a stabilized, high magnification NFOV sensor system 190, a commercially available Gyrocam™ gimbal system was selected which has multi-axis stabilization 191*b*, three sensors: color visible 192, medium wave IR (MWIR) FLIR 193, and an image intensifier coupled to a CCD 194 (e.g., for digital output), and various high magnification settings for all the sensors. The Gyrocam™ gimbal system has analog signal interfaces to control movement of the gimbal head 191*a*, control the multiple sensors (192-194) inside the gimbal head 191*a*, and control which sensor's imagery to display 110 to the operator, as well as interface(s) for the image output 195 from each sensor. Such a Gyrocam™ gimbal system was configured to have a gimbal sensor head 191*a*, a kneepad controller 170, a touch-screen display 110, and an interface module 182. To allow digital interface connections to the GUI system server 120, an interface unit was implemented based on a T connection 180 to serve as a system junction box that ensures the proper voltages and currents are applied to, and read from, the gimbal sensor head 191*a* based on operator inputs through, e.g., the GUI touch screen 111 and/or the kneepad controller 170. An exemplary WFOV IR camera 150 chosen was the Drivers Vision Enhancer (DVE) produced by DRS Technologies, Inc. Such DVE sensors can have an additional port on DVE to display the sensor output on another second separate display. The Gyrocam™ extendable mast with sensor head implemented as the NFOV sensor system 191*b* is mounted on the rear of a vehicle, which may be a HMMMV. A DVE IR camera 150 and color visible camera 140 are mounted near or in front of the windshield as WFOV sensors, which facilitates viewing by vehicle's driver of the surroundings.

Figure 2:
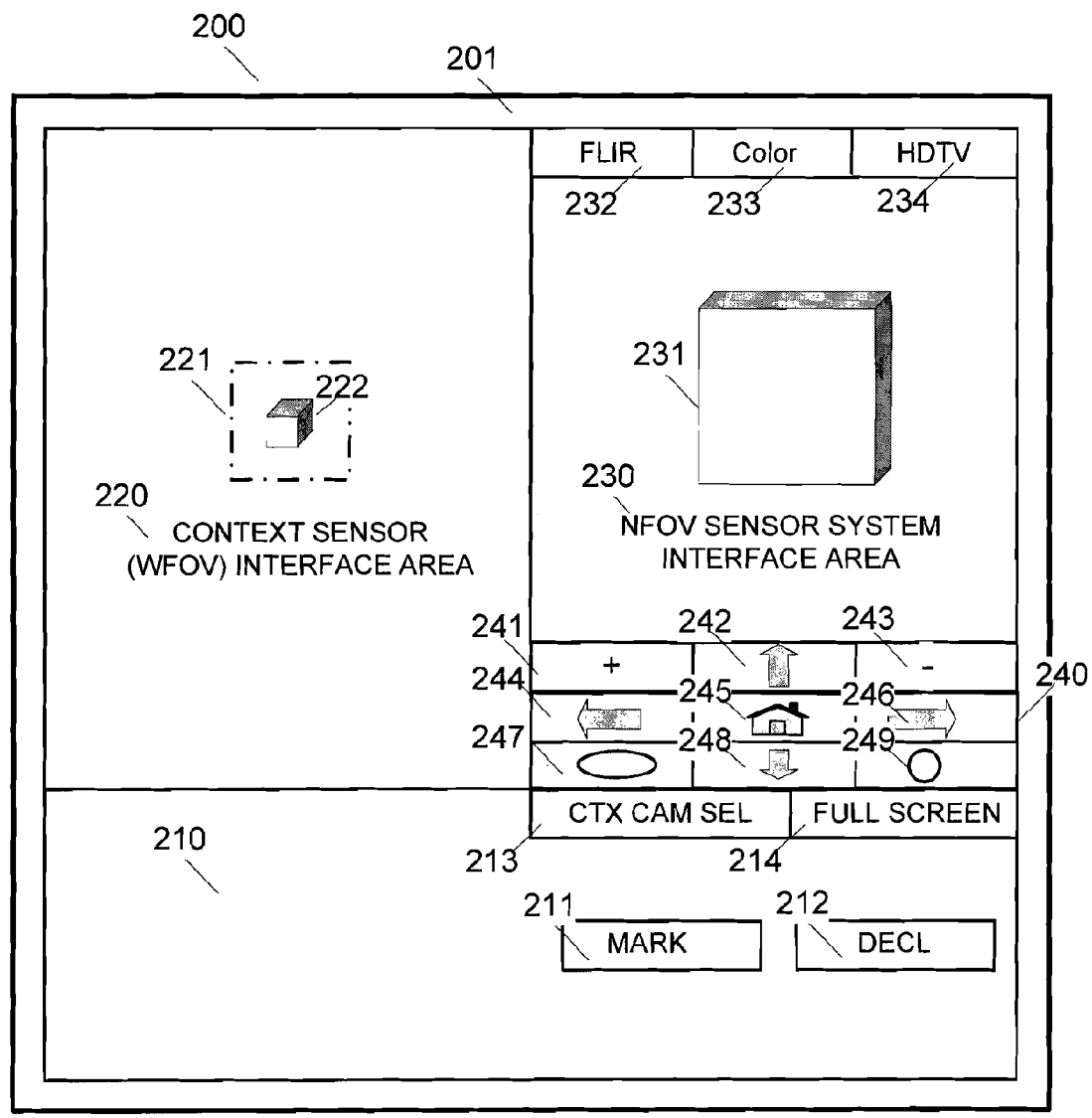
FIG. 2 shows an exemplary graphical user interface layout having a partitioned layout for interactive display of sensor-based images.

The GUI system 100 display 110 with which an operator interacts is shown in FIG. 2. The system 100 is configured with inputs (e.g., 141, 151, 161, 171, 181 and 195) from multiple sensors and sensor types (e.g., 140, 150, 160, 170 and 190). It can include, e.g., an Illunis XMV-2020C HDTV format, color visible camera 140 and DVE IR camera 150 used as the WFOV sensors with their FOV set at approximately 40 degrees horizontally. Alternatively, in another example, the WFOV color context camera 140 can be implemented with a JAI/Pulnix CV-M8CL camera which utilizes a 3-CCD technology.

FIG. 2 shows an exemplary graphical user interface layout having a partitioned layout for interactive display of sensor-based images. Images from these WFOV sensors (e.g., 140 and/or 150) can be shown on the left hand side of the GUI touch screen display 200, as indicated in FIG. 2 as a context sensor (WFOV) interface area 220.

The NFOV sensors (192-194) in this exemplary configuration can be those within the commercially available Gyrocam Triple Sensor TS™: a mid-wave IR 193, a color visible 192, and an image intensifier coupled to a CCD 194 (e.g., for digital output). These can be set to FOVs that are approximately 2.5 degrees horizontally. Imagery from these sensors can be displayed in the upper right hand side 230 of the GUI touch screen 111 such as the color image shown in FIG. 2 from, e.g., the Gyrocam™ color visible sensor 192. A reticule 221 is overlaid on the WFOV image being displayed 222 to show the operator where the NFOV sensor (e.g., 192-194 of 190) is pointing. The mid-lower right side of the GUI 240 can have buttons (e.g., 241-249) that implement controls necessary to move a gimbal sensor head 191*a*, e.g., of a Gyrocam™ gimbal system, in various directions. A gimbal "home" button 245, shown in FIG. 2, is provided to control the gimbal system 191*b* to move the gimbal sensor head 191*a* to a known position, e.g., in case of operator confusion. There can be tabs (e.g., 232-234) along, e.g., the upper right hand side 230 of the GUI touch screen display 200 to allow an operator to select which NFOV sensor imagery (e.g., 192, 193 or 194) to display. A large button 213, e.g., below the gimbal controls can allow an operator to select which WFOV sensor imagery (e.g., 140 or 150) to display, e.g., on the context sensor (WFOV) interface area 220.

Optionally, there can also be a full screen mode selectable by touching a 'Full Screen' button 214. As also shown in FIG. 2, 'Mark' 211 and 'Decl' 212 buttons can be provided to allow user touch-screen marking (confirm) of an object image or to declare by touch-screen marking a suspicious object image. These 'Mark' 211 and 'Decl' 212 touch-screen buttons have been primarily used for testing and evaluation purposes.

Further, based on data inputs to the connections 121 to the server 120, e.g., from GPS 170 and/or other sensors, system messages, such as time and vehicle location, can be displayed to the operator in a display area, e.g., below the button controls 210.

As illustrated in FIG. 2, the pointing of a gimbal by an operator can be done in multiple ways, e.g.:
1. touching the WFOV image area being displayed (e.g., 220);
2. touching the buttons found in the lower right hand side of the GUI display (241-249);
3. touching within the NFOV image area being displayed (e.g., 230).

When touching the WFOV image area (e.g., 220), the pixel x, y location at the point in the image being touched is translated from pixel x, y coordinates into angle space in order to issue commands to move the gimbal to a particular azimuth and elevation. The conversion from image coordinates to angle space is done through a flat earth approximation.

Touching the gimbal control buttons (e.g., 241-249) on the right hand side of the display 240 moves a gimbal sensor head 191*a*, e.g., at a constant rate while they are held down in the direction of the arrow shown on the button (e.g., 241-249).

Touching the NFOV image (e.g., 230) being displayed can cause the gimbal sensor head 191*a* to move at a variable rate based on the distance from the center of the image: touch closer to the center can cause smaller or slower incremental moves while touching closer to the outer edge 230 causes faster or larger incremental moves of the gimbal sensor head 191*a*. Direction of movement is identical to the arrow buttons (e.g., 242, 244, 246 and 248); touching the top or bottom of the image causes the gimbal sensor head 191*a* to move up or down respectively and the same when touching the left or right side of the image.

The GUI system 100 can also have the capability to provide a proximity warning to an operator. This proximity warning is based on Global Positioning System (GPS) 170 coordinates of previous incidents. In an exemplary embodiment, a Garmin GPS-18 5 Hz (Garmin part 010-00321-07) can provide positional updates to the GUI system 100. This device is connected, e.g., via a serial port, to the server connection 121, e.g., on an X7DA8 motherboard via a DB9 connector. At system power-up, the Garmin device is switched into binary mode by sending it a Garmin-specific command sequence. This is done to place it into a known state. After this is complete, the GPS 170 communicates to the GUI system 100 via a binary protocol, providing position updates at, e.g., 5 Hz rate. A thread of execution manages the receipt of data from the GPS 170.

The digital compass 160 can be a Sparton SP3003D device. Such a compass 160 can be connected to the server 120 by a serial connection 121, e.g., via a Serial-to-USB translator. Using such a translator, such a compass 160 can be connected as a server connection 121. Similar in operation to the GPS device 170, the compass 160 communicates to the GUI system 100 in binary mode via a defined command set. An API was written to facilitate use of this device. The compass functionality can provide heading updates to the system within the same thread used to access the GPS device, e.g., at 5 Hz updates.

Further, the proximity warning can be accomplished by turning the border 201 of the GUI touch screen display 200 from its natural grey color to yellow meaning that the vehicle system 100 is approaching an incident and then finally red when the vehicle system 100 is closer to the incident. As the vehicle system 100 passes and travels further away from the previous incident, the sequence of border colors reverses indicating to the operator the incident area has passed.

Such a GUI system 100 can be implemented based on the use of WFOV sensors (e.g., 140 or 150) to point NFOV high magnification sensors 190 with a multi-sensor GUI 111. The computer system (e.g., 120, 121) which provides the processing throughput necessary to acquire the sensors data (e.g., 141, 151, 161, 171 and/or 195), manipulate pointing angles, process signals 120, write graphics 111 on the touch screen display 110, record data, and process operator inputs can be a Supermicro X7DB8 motherboard with a Intel Xeon X5355 Dual Quad 2.66 GHz with 4 GB of RAM. An NVIDIA GeForce 8800 GTX graphics card can be used to display 110 information on the Hope Industrial Systems Touch screen Monitor, HIS-ML2I, eLo Driver v4.40. Coreco—Bandit III CV and X64-CL-Dual frame grabbers can be utilized to acquire data from the sensors. An Areca ARC1220 PCI-E to SATA II 8 port RAID controller can be used to form a RAID using eight Seagate 750 GB SATA II disk drives. A Garmin GPS 18 5 Hz USB puck antenna 170 can provide access to the GPS signal input to the system server 120 via an interface 121 connection 171.

The programming language used to implement the system can be a mix of C and C++ compiled using Microsoft's Visual Studio 2005 Professional, v8.0.50727.42 and Intel's C++ compiler v 10.0. Other software used includes NVIDIA CUDA v0.8, Perl v5.8.7, Trolltech Qt Commercial 4.3.1, Intel Performance Primitives v5.2, Coreco SaperaLT v5.30.00.0596, and Garmin nRoute v2.6. 1. The underlying operating system platform for the NVESD GUI development can be Microsoft Windows XP Pro Version 2002 SP2.

Software Implementation

An exemplary code written to implement such a system operates as follows. Such a user interface subsystem can be written using, e.g., Qt GUI widgets. For example, each display thread can begin with some typical initialization steps; it then enters a loop. At the top of this loop, such a thread sets a windows event to signal that it is ready to receive a frame of sensor data (e.g., from 141, 151, 161, 171 or 195). It then waits on an appropriate 'frameAvailable' event. This event is signaled by a callback after the callback moves a frame into a buffer visible to the display thread. When this event is signaled, the display thread formats the frame for the appropriate display mode and then moves it to the appropriate Qt display surface. After this is complete, a Qt display event is posted to an applications main Qt Event Loop. The display thread then repeats from the top of its main loop.

Further, to implement the GUI system pointing of the NFOV sensor 190, two functions are described:
1) point_at( ) which takes pixel coordinates for a specific Context sensor (140 or 150) and returns the pointing angles (azimuth and elevation) of the Target (e.g., 222) as seen from the NFOV sensor (e.g., as displayable in NFOV sensor system interface area 230); and
2) point_to_pixel( ) which takes the current pointing angles of the NFOV sensor (see, e.g., 191*a*) and translates it back to Context sensor (140 or 150) pixel coordinates for positioning of the reticle 221 or other on-image graphics in the context sensor (WFOV interface area 220.

Figure 3:
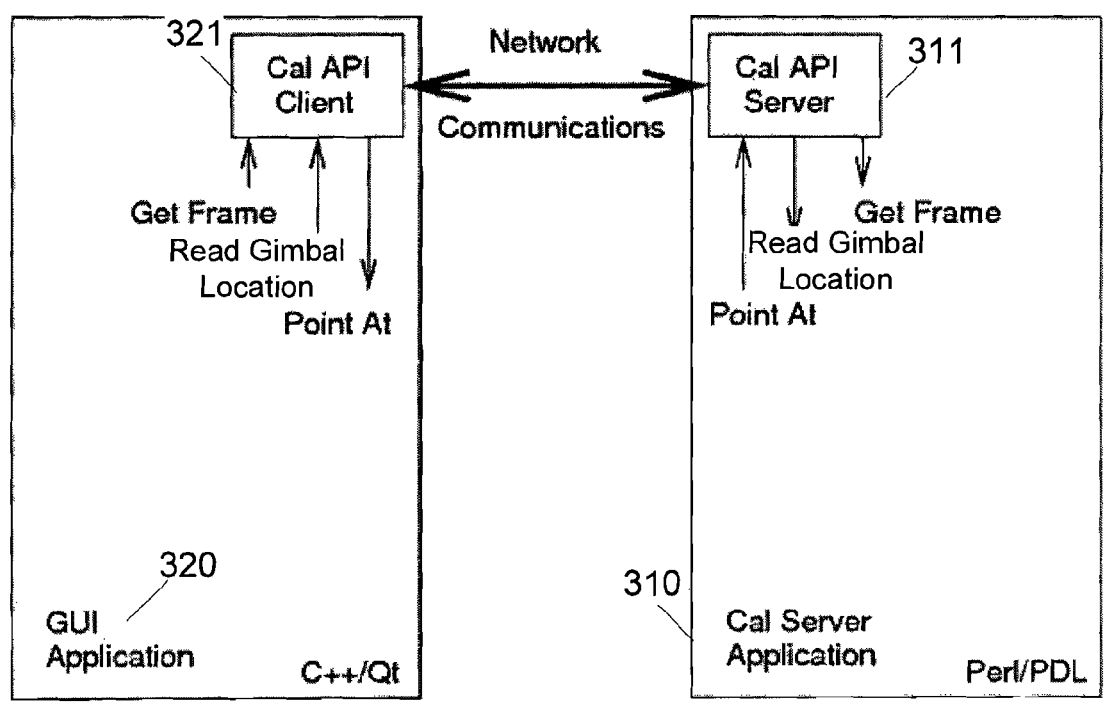
FIG. 3 is a flow diagram representation of a client/server interaction to effectuate a pointing process in accordance with an illustrative embodiment of the disclosure.

FIG. 3 is a flow diagram representation of a client/server interaction to effectuate a pointing process in accordance with an illustrative embodiment of the disclosure. It shows exemplary steps of the image processing system based on an exemplary client/server interaction model. A Calibration Programming API (Cal API or CPI) can be used to split functionality of the GUI software components (hardware interface, control, and visualization) from the calibration and pointing algorithms. The current implementation uses a network socket to communicate between the GUI and a calibration server code. The GUI code (e.g., 320) can be C++/Qt based, and the calibration server code (e.g., 310) can be written in Perl/PDL.

The exemplary GUI and Cal Server codes (e.g., 310 and 320) were developed as separate applications. For performance, the Cal Server application 310 could be refactored into a separate thread within the GUI Application 320. For runtime operation with the current GUI System, the aforementioned point_at( ) and point_to_pixel( ) can be implemented and C/C++ can be used to optimize the computations point_at( ) and point_to_pixel( ) can be viewed as inverse operations. For example, point_at( ) can be viewed as taking a Context pixel location and returning the pointing direction to the Target (e.g., 231) from the NFOV sensor (see, e.g., 191*a*). The second point_to_pixel( ) can be viewed as taking the direction of the NFOV sensor (see, e.g., 191*a*) and returns the Context pixel location for positioning of the reticle 221 or other on-image graphics.

Calibration Programming Interface

The Calibration Programming Interface (CPI) is described to exemplify a program implementation of a pointing algorithm. Such a calibration programming interface can be provided in addition to the GUI software system to provide a remote function call capability for calibration. Such an application programming interface (API) provides functions to allow applications (e.g., a calibration application or Cal Server 310) to perform the complete set of operations for system sensor calibration as exemplified in FIG. 4.

Figure 4:
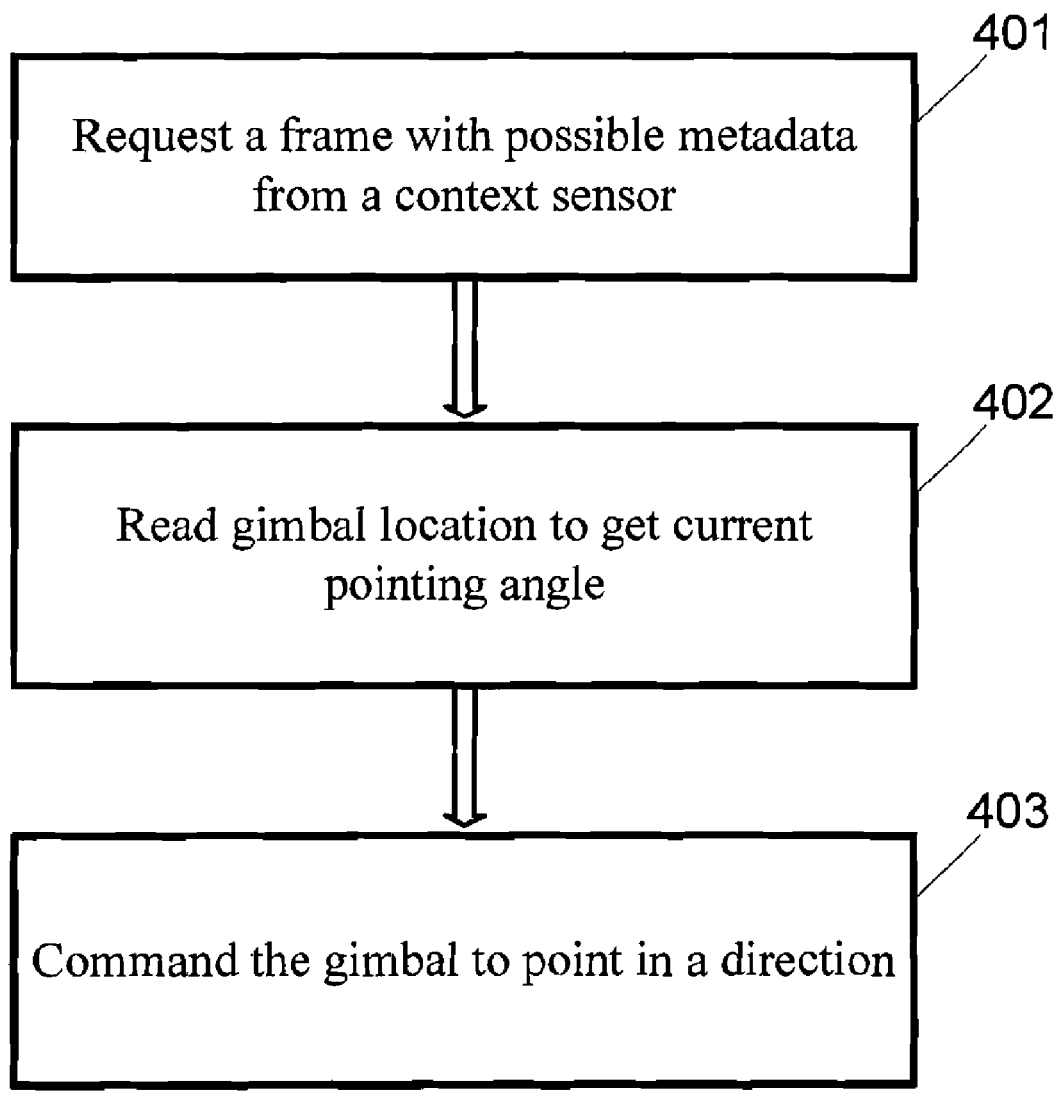
FIG. 4 shows exemplary steps of a pointing process.

FIG. 4 shows exemplary process steps to point a NFOV gimbal in a direction as follows:

Step 401. Request a frame with possible metadata from a sensor. This step requests data from a given WFOV sensor (e.g., 140 or 150) with optional meta data. The latest frame from a WFOV sensor (e.g., 140 or 150) is returned with the timestamp, frame data, and meta data.

Step 402. Read gimbal location to get current pointing angle (azimuth, elevation). This step reads current gimbal 191*b* position information (e.g., azimuth and elevation) with optional meta data. Status, timestamp, azimuth/elevation in degrees, and meta data are returned.

Step 403. Command the gimbal to point in a direction. This step requests a move of the gimbal 191*b* to point the NFOV sensor head 191*a* to the desired direction (e.g., azimuth and elevation). Status, timestamp, and meta data at the end of the move are returned.

Such exemplary steps can provide a set of capabilities to allow an application to perform measurements, to calibrate, and to verify calibration for such a GUI System 100. With such controls for the cameras and the gimbal (e.g., 191*b*), the functionality to perform such a pointing process may be implemented in the control application.

Such a client-server interface (311/321) approach as exemplified in FIG. 3 can have certain advantages for the GUI system 100: Referring to FIG. 3, such a client 321 server 311 interaction allows for the possibility of multiple GUI Application 320 hosts by supporting multiple computers and/or multiple applications controlling the different sensors. Each instance need only run its own CPI server 311. It allows development and software for calibration 310 to evolve independently from the GUI application 320. The more independent the component efforts are, the simpler the management, implementation, and testing becomes. Further, the calibration application 310 can use a set of tools independent of the GUI System software (scripting languages, utilities, . . . ) allowing for rapid prototype development. Once the application is developed, it can be ported to C/C++ to allow for maximum performance and tighter system integration.

GUI System

Data from sensors (140, 150, 160, 170 and/or 190) can be obtained using, e.g., Sapera frame grabber callbacks that acquire imagery from the sensors through acquisition cards and submit them to the user interface subsystem that displays 110 the images to the operator. Data from such sensors can be set to be always acquired. Buttons (e.g., 232-234 and/or 213) on the GUI display 200 can be used by the operator to signal the user interface subsystem as to which sensor's data to display. Simultaneously, a gimbal control subsystem can constantly monitor the gimbal 190 position by monitoring gimbal position signals 181 from the NFOV sensor system 191*b*. Operator actions such as touching the GUI touch screen 111 to move the gimbal sensor head 191*a* translate into messages being created by the user interface subsystem and sent to the gimbal control subsystem to reposition the gimbal sensor head 191*a*.

The gimbal control subsystem translates the x, y image coordinates into angle space azimuth and elevation values as aforementioned. These values are then placed on the gimbal position control lines 181, e.g., interfaced to the T connection 180 to move the gimbal sensor head 191*a* to the desired position. When the operator touches any of the camera control buttons (e.g., 241-249), such as focus (e.g., 247 or 249) or zoom (e.g., 241 or 243), the user interface subsystem places the appropriate signals on a server connection 181, e.g., serial I/O connections, to the sensors (e.g., 192-194).

A GPS subsystem constantly monitors GPS words obtained from GPS (e.g., GPS 18-5 Hz from Garmin) 170, which may be raised through a GPS antenna, to determine vehicle position. The GPS subsystem then sends a message with the vehicle location to the user interface subsystem for display 110 to the operator. The GPS subsystem can also maintain the list of previous incidents. The GPS subsystem can send to the user interface subsystem a message indicating that the current vehicle position is within a threshold distance from a previous incident. When the user interface subsystem receives this message, the display border 201 can indicate a warning by changing the display border color to an appropriate color. The operator can control the entire GUI system 100 through interactions with the user interface subsystem (e.g., 111) as described above.

With a Gyrocam™ system, an electrical "T" connection or "T" box 180 was provided between the GUI system server 120 and the Gyrocam™ 190 gimbal 191b to integrate such an analog sensor system 190 with a digital GUI system 100. The electrical "T" connection was implemented to integrate with a Gyrocam™ interface module (182) and a Gyropad kneepad controller 170. For example, the "T" connection 180 was accomplished by "severing" various controller lines between the Gyrocam™ interface unit 182 and the kneepad controller 170 and inserting a "T" connection 180 implemented with commercially available commercial modules capable of converting analog signals to digital and vice versa. It is not necessary to physically cut the wires themselves to implement the connection. Gyrocam™ cable connection between the Gyrocam™ Interface Module (GIM) 182 and the Gyrocam™ Kneepad Controller (GKC) 170 was disconnected at the GIM 182 and reconnected to the "T" connection module 180.

Inside this module 180, control signals were connected to analog-to-digital converter ADC and digital-to-analog converter DAC modules while other signals were passed through untouched. The "T" connection module 180 was then connected through a cable to the GIM 182. Additional signal lines and Gyrocam™ gimbal pointing angles were connected from the GIM to the "T" connection module 180 since these lines did not go to the GKC 170. Connectivity between the "T" connection module 180 and a PC was accomplished using a USB connection.

Upon completion of the electrical "T" connection module 180, software was written to read the values produced by the ADC to monitor various aspects of the sensor head, including its current pointing angle in azimuth and elevation and gimbal head height. Software routines were also written to place analog signals on the control lines through the DAC module. These routines included sensor zoom 241 and de-zoom 243, focus 247 and de-focus 249, and sensor head azimuth and elevation position changes (e.g., 242, 244, 246 and 248). The software routines were then written to be initiated through the operator's interaction with the GUI touch screen display 111. Thus, the analog Gyrocam™ gimbal system (e.g., 190) is integrated with and controlled by a digital-based touch screen GUI system 100.

The GUI system 100 can enhance the operator's ability to investigate potential threats while maintaining situational awareness while on the move or being stationary. It allows the operator to efficiently and effectively point a NFOV high magnification sensor to multiple positions for further investigation without becoming disoriented.

GUI System Pointing Algorithm

An algorithm for the touch screen pointing was implemented for the GUI System. The touch screen pointing functionality allows an operator to touch a point of interest in a context sensor (WFOV) interface area 220 to slew the NFOV sensor system 190 to point to that location (e.g., 221) for high magnification interrogation of the region of interest (ROI).

A touch screen interface 111 allows an operator to select points of interest in the Context sensor (WFOV) image 220. The NFOV sensor system 190 is then commanded to point the sensor head 191a to the target location for a NFOV sensor system view 230 under high magnification.

The GUI system 100 uses the relative geometry between the Context camera (140 or 150) and the NFOV sensor (192, 193 or 194) together with the location of the Target (e.g., 222) in space (direction and range from the context sensor) to determine the relative bearing from the NFOV sensor (192, 193 or 194) to the Target (the "pointing angle").

To calculate the pointing angle (i.e. azimuth and elevation) from the Zoom sensor (e.g., 191a) to the Target geometrically we use the following input parameters:

1. Distance and Orientation of NFOV and Context sensors with respect to the vehicle (e.g., GUI system 100). These parameters can be determined by measurement or a calibration process.
2. NVOF and Context sensor total fields of view (FOV) and focal plane dimensions used to convert between pixels coordinates, (x,y), and the pointing angles, (azimuth, elevation), relative to each sensor. Because the pointing direction is of interest for the NFOV sensor, the FOV and focal plane information are not needed for the NFOV sensor (192-194).
3. Range from the context sensor (140 or 150) to Target. For example, a "Flat Earth" approximation was used to obtain the range. Errors in the range estimate can result in the pointing direction errors and the Target may be off-center or even out of the FOV of the NFOV sensor.

Figure 5:
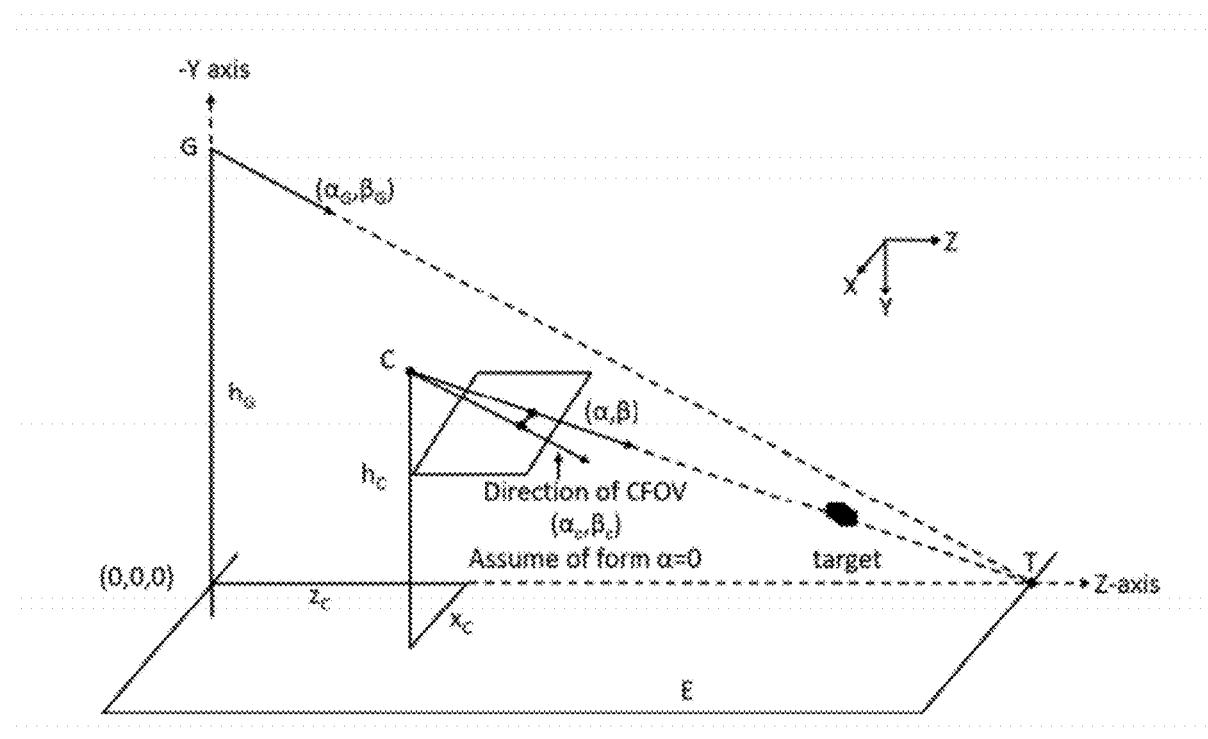
FIG. 5 shows an exemplary vector representation to illustrate the pointing algorithmic process.

FIG. 5 shows an exemplary vector representation to illustrate the pointing algorithmic process as it relates to the graphical user interface to the NFOV gimbal system. The following pseudo-code represents an exemplary implementation of the pointing algorithm, e.g., as applied to a target disposed below the level of a Context sensor (140 or 150). Such an exemplary set of steps are:

1. Read the pixel coordinates (x,y) of the target in a Context image from touch screen touch location or mouse click coordinates.
2. Use the context sensor geometry and optical parameters to calculate the direction vector from the context sensor location C to the target. For example, use the Context FOV to convert the context image pixel coordinates (x,y) to coordinates (az',el') of target from the Context sensor (140 or 150).
3. Compute the 3D position, T, where that direction vector through target pixel intersects a ground plane. For example, as shown in FIG. 5, project a vector from the context sensor location, C, in the (az',el') direction to calculate the intercept with a flat ground plane, E, at a point T (i.e. the Flat Earth target position estimate). This is the "flat earth" approximation.
4. Calculate the vector GT from the NFOV sensor position G to the estimated point T of target. Normalize the vector GT to unit length and determine the corresponding direction angles by which to point the NFOV sensor gimbal to the target location. For example, calculate the azimuth and elevation (az,el) values corresponding to the unit vector pointing from the NFOV sensor location, G, to T by normalizing (T−G) to a unit length and determine the corresponding direction angles by which to point the NFOV sensor head (e.g., 191a) to the target location in terms of azimuth and elevation.
5. Use the derived azimuth and elevation (az,el) values as a basis for pointing the NFOV sensor head 191a at T.

For this example, the inputs are the (x,y) pixel of target in a context image 220. The output is the azimuth and the elevation information calculated for the NFOV sensor head 191a to the Target. The pointing errors from this approach can be related to the range difference between T and the target. Further, when the target is disposed above the horizon as seen from the Context sensor, the viewing ray from the Context sensor center through the target pixel location may not intersect the ground plane E. Accordingly, a heuristic approach can be used to determine the range from the Context sensor to the target $R_{CT}$ if the target is disposed above the horizon.

Linearized Pointing Equations

We linearize the pointing equation for computational processing of the algorithmic steps. We define $$\beta_{c0} = \arctan\frac{h_C}{R_{max}},$$

relating to the declination of T referenced to the context sensor location C of height $h_C$. For the case where the target is below the horizon for the context sensor ($\beta \geq \beta_{c0}$), we calculate the "Flat Earth" range as $$R_{CT} = \frac{hc}{\tan\beta}$$

Where $R_{CT}$ is the range from the context sensor at C to T, and
The full coordinate location T is calculated based on the vehicle coordinate system as follows:

$$X_T = R_{CT} \sin \alpha + x_C$$

$$Z_T = R_{CT} \cos \alpha + z_C$$

$$R_T = \sqrt{X_T^2 + Z_T^2}$$

Given the coordinates of the NFOV sensor in vehicle coordinates $(0, -h_G, 0)$, where $h_G$ relates to the mast height for NFOV sensor, and the target location in vehicle coordinates $(X_T, 0, Z_T)$, we can now solve for the NFOV sensor declination and azimuth angles as follows:

$$h_\Delta = h_C - R_{max}\tan\beta$$

$$\beta_G = \arctan\frac{h_G - h_\Delta}{R_T} \text{ if } \beta_{c0} > \beta \geq \beta_{cg},$$

$$\text{where } \beta_{cg} = \arctan\frac{h_C - h_G}{R_{max}}$$

$$\beta_G = \arctan\frac{h_G}{R_T} \text{ if } \beta \geq \beta_{c0}$$

$$\alpha_G = \arcsin\frac{X_T}{R_T}$$

These are the desired pointing angles as can be computed for the NFOV sensor gimbal.

Evaluation and Testing

Based on the system evaluation and testing, the current GUI system 100 WFOV imagery 220 allows operators to better focus on important regions of interest (ROIs) without getting sucked into the "soda straw" of the NFOV sensors (e.g., 192-194). Operators always have a live feed of what is approaching and an indication of where the current NFOV sensor view 230 is within the WFOV 220. The automatic pointing of the NFOV sensor head 191a to ROIs (e.g., 221) from the WFOV sensor (140 or 150) allows for much simpler investigation of candidate ROIs. The automatic slew to the desired azimuth and elevation together with the stabilization of the NFOV sensor head 191a means that the operator can immediately investigate potential targets (e.g., 221), fine tune the location manually with the touch interface 111 to the NFOV image window 230, and switch focus of attention between the WFOV context view 220 and the current NFOV zoomed view 230. The stabilization means that the ROIs (e.g., 221) will maintain location while the operator attention is on the context information. Further, the ability to toggle between the alternative WFOV sensors (for example, between the XMV-2020C 140 and the DVE 150 based on a touch selection 213) allows the operator to switch to the sensor view 220 that offers the most information for the scene and viewing conditions. The GUI 200 then allows for a quick change to the corresponding NFOV sensor (e.g., 232, 233 or 234) and zoom to best view to interrogate the potential target ROI (e.g., 231).

The GUI system 100 has been developed to support the use of varying sets of sensors for both the WFOV sensors (e.g., 140 and 150) and the high magnification NFOV sensors (e.g., 192-194). The software is designed to allow additional sensors to be added in a symmetric fashion to the existing ones. For example, it is a simple configuration change to go between the XMV-2020C sensor and an alternate 3 CCD color sensor for the context color camera 140. Likewise, the hardware (e.g., 121) makes use of the Camera Link Interface standard to allow a common video acquisition card be used across multiple different imaging sensors. This card could include a library of known target items, against which the information obtained from the sensors can be compared. For example, if the sensors capture the image of a pipe bomb, the GUI 200 could be designed to flash the word "pipe bomb." Finally, the GUI system 100 can constantly receive data from all the sensors. This allows for the recording of image data and meta-data (GPS position, time, vehicle attitude, gimbal pose) for data collection purposes, post-processing for algorithm studies or after action analysis.

Field Testing

Field tests have shown improved operator performance in terms of range to object and search times. For example, an exemplary vehicle-mounted GUI system included a WFOV (HDTV format) visible color camera 140 used for context imaging 220, high magnification, NFOV Mid-wave Infrared and visible color (640×480 format) cameras on a mast with a pan/tilt head 191a (electronic stabilization 191b) for NFOV imaging 230 and a touch screen 111 based graphical user interface 200.

In such vehicle-mounted field tests, an operator pointed the pan/tilt head 191a by, e.g., touching the WFOV image 220. When touching the WFOV image 220, the pixel x, y location at the point in the image being touched is translated from pixel x, y coordinates into angle space in order to issue commands to move the pan/tilt head 191a to a particular azimuth and elevation. The conversion from image coordinates to angle space is done through a flat earth approximation. The testing showed detection ranges more than doubling from an average of 20 m out to an average of 55 m. Vehicle speeds in the testing were 5, 10, and 20 MPH.

The invention has been described in an illustrative manner. It is to be understood that the terminology which has been used is intended to be in the nature of words of description rather than limitation. Many modifications and variations of the invention are possible in light of the above teachings.

Therefore, within the scope of the appended claims, the invention may be practiced other than as specifically described.

Cross-References $\beta$—The declination, e.g., angle below the horizon, of a target seen from C.

$\beta_G$—The declination, e.g., angle below the horizon, of a target as seen from G.

$\beta_{c0}$—The declination, e.g., angle below the horizon, of a "wall" base as seen from C, the "wall" based at $R=R_{max}$ distance from C on ground.

$\alpha$—The azimuth angle of a target seen from C in vehicle coordinate system.

$\alpha_G$—The azimuth angle of target as seen from G.

$R_{CT}$—The range from C through a target to T on ground plane.

$x_C$—The x distance of the zoom (NFOV) sensor mast offset from location C.

$z_C$—The z distance of the zoom (NFOV) sensor mast behind location C.

$h_C$—Context camera height.

$(0, -h_G, 0)$—Vehicle coordinate values for an NFOV sensor.

$h_\Delta$—The height on an $R_{max}$ "wall" where a ray to target from C intersects.

$R_{max}$—Effective maximum ground range to target from C.

$(X_T, 0, Z_T)$—Coordinate values for target location in vehicle coordinates.

$R_T$—A ground plane range from a zoom (NFOV) sensor through a target to T on ground plane.

What we claim is:

1. A method of pointing a gimbal sensor to identify threats located in a context image of graphical user interface, comprising the steps of:

reading x and y coordinate values of an object image as located in a context image provided by a sensor capable of a context field of view;

using the context field of view to convert the x and y coordinate values to a first set of azimuth and elevation values for the object image from the context sensor;

projecting a vector from the context sensor location in a direction indicated by the first set of azimuth and elevation values for the object image to calculate an intercept with a flat ground plane at a point T;

calculating a set of derived azimuth and elevation values based on a spatial relationship between a gimbal sensor and the point T; and using the derived azimuth and elevation values as a basis for pointing the gimbal sensor at T.

2. The method according to claim 1, wherein said x and y coordinate values are based on a touch location of a touch screen, or mouse click coordinates, 3. The method according to claim 1, wherein the x and y coordinate value inputs are based on coordinate values pertaining to the object image pixels in the context image.

4. The method according to claim 1, wherein the derived azimuth and elevation values are derived based on calculating a unit vector pointing from a gimbal sensor location to the point T.

5. The method according to claim 1, wherein said intercept with a flat ground plane at a point T is computed based on a flat earth position estimate, wherein gimbal sensor declination and azimuth are computed.

6. The method according to claim 5, wherein said flat earth position estimate applies for the case where the imaged object is below the horizon for the context sensor.

* * * * *